(12) United States Patent
Precious et al.

(10) Patent No.: US 9,009,670 B2
(45) Date of Patent: Apr. 14, 2015

(54) AUTOMATED TESTING OF APPLICATION PROGRAM INTERFACES USING GENETIC ALGORITHMS

(75) Inventors: Andrew M. Precious, Duvall, WA (US); Thomas A. Walton, Seattle, WA (US); Anish Swaminathan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 592 days.

(21) Appl. No.: 13/179,221

(22) Filed: Jul. 8, 2011

(65) Prior Publication Data

US 2013/0014089 A1 Jan. 10, 2013

(51) Int. Cl.
*G06F 9/44* (2006.01)
*G06F 11/36* (2006.01)

(52) U.S. Cl.
CPC .................................. *G06F 11/3672* (2013.01)

(58) Field of Classification Search
CPC G06F 11/3672; G06F 19/707; G06F 2217/08
See application file for complete search history.

(56) References Cited

U.S. PATENT DOCUMENTS

| 5,708,774 | A * | 1/1998 | Boden ........................... 714/38.1 |
| 6,625,760 | B1 | 9/2003 | Man et al. |
| 7,386,839 | B1 * | 6/2008 | Golender et al. .............. 717/131 |
| 7,496,898 | B1 * | 2/2009 | Vu ................................. 717/127 |
| 7,747,984 | B2 | 6/2010 | Hsu |
| 7,808,503 | B2 | 10/2010 | Duluk et al. |
| 7,996,816 | B2 * | 8/2011 | Francis et al. ................ 717/124 |
| 8,151,256 | B2 * | 4/2012 | Ramannavar et al. ........ 717/168 |
| 8,468,502 | B2 * | 6/2013 | Lui et al. ...................... 717/127 |
| 2002/0178301 | A1 * | 11/2002 | Boyd et al. .................... 709/328 |
| 2004/0268311 | A1 * | 12/2004 | Pizzoli et al. ................. 717/124 |
| 2005/0066309 | A1 | 3/2005 | Creamer et al. |
| 2006/0066612 | A1 | 3/2006 | Yang et al. |
| 2007/0279701 | A1 * | 12/2007 | Hsu .............................. 358/403 |
| 2007/0283331 | A1 * | 12/2007 | Pietrek ......................... 717/130 |
| 2007/0294671 | A1 * | 12/2007 | Demetriou et al. ........... 717/124 |
| 2008/0175480 | A1 | 7/2008 | Shi et al. |
| 2009/0199173 | A1 * | 8/2009 | Ramannavar et al. ........ 717/168 |
| 2011/0055120 | A1 | 3/2011 | Baskent et al. |
| 2011/0078790 | A1 * | 3/2011 | Fazunenko et al. ............ 726/22 |
| 2011/0167414 | A1 * | 7/2011 | Lattner et al. ................. 717/140 |
| 2012/0078913 | A1 * | 3/2012 | Muni et al. .................... 707/740 |
| 2013/0014089 | A1 * | 1/2013 | Precious et al. .............. 717/131 |

OTHER PUBLICATIONS

Edward B. Boden et al.; Testing software using Order-based Genetic Algorithms; 1996 MIT; pp. 461-466; <http://dl.acm.org/citation.cfm?id=1595617>.*

(Continued)

*Primary Examiner* — Thuy Dao
*Assistant Examiner* — Cuong V Luu
(74) *Attorney, Agent, or Firm* — Brian Haslam; Mike Allen; Micky Minhas

(57) ABSTRACT

Various embodiments enable automated testing of Application Program Interfaces (APIs) by abstracting API call signatures and processing the abstracted API call signatures utilizing one or more genetic algorithms. Utilizing the inventive approach, test cases are built and then analyzed using a genetic algorithm. This can be done to both identify problems, such as bugs, associated with the APIs, and/or to identify quality improvements.

21 Claims, 7 Drawing Sheets

(56) References Cited

OTHER PUBLICATIONS

Joachim Wegener et al.; Evolutionary test environment for automatic structural testing; 2001 Elsevier; pp. 841-854; <http://www.sciencedirect.com/science/article/pii/S0950584901001902#>.*

Matthias Grochtmann; Testing temporal correctness of real-time systems by means of genetic algorithms; 1997 research and technology; 13 pages; <http://test-agentur.de/documents/qualityweek1997.pdf>.*

Jose Ribeiro Filho et al.; Genetic algorithm programming environments; 1994 IEEE; pp. 29-43; <http://ieeexplore.ieee.org/stamp/stamp.jsp?tp=&arnumber=294850>.*

Sung-Bae Cho; Towards creative evolutionary system with interactive genetic algorithm; 2002 Applied Interlligenc, pp. 129-138; <http://link.springer.com/article/10.1023/A:1013614519179#page-1>.*

Yu Bo et al.; Tabu search and genetic algorithm for generating test data of class testing; 2009 IEEE; 6 pages; <http://ieeexplore.ieee.org/stamp/stamp.jsp?tp=&arnumber=5363652>.*

Boschetti, et al., "Comparison between interactive (subjective) and traditional (numerical) inversion by Genetic Algorithms", Retrieved at <<http://ieeexplore.ieee.org//xpls/abs_all.jsp?arnumber=870341>>, Proceedings of the 2000 Congress on Evolutionary Computation, 2000, pp. 522-528.

* cited by examiner

AUTOMATED TESTING OF APPLICATION PROGRAM INTERFACES USING GENETIC ALGORITHMS

BACKGROUND

Developing new Application Program Interfaces (APIs) can involve intensive tests to ensure that API goals are met. For example, API designers typically have quality considerations that are taken into account when developing new APIs. Some of these quality considerations can pertain to such things as analyzing different versions or similarly functioning APIs to ensure that they have not regressed.

To date, in order to accomplish these and other tests, a human designer typically author specific test cases, conduct usability studies, and performs time intensive ad-hoc testing to ensure that design goals are met. Generally, this process can take on the order of months to perform and can consume numerous resources along the way.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments enable automated testing of Application Program Interfaces (APIs) by abstracting API call signatures and processing the abstracted API call signatures utilizing one or more types of genetic algorithms Utilizing the inventive approach, test cases are built and then analyzed using a genetic algorithm. This can be done to both identify problems, such as bugs, associated with the APIs, and/or to identify quality improvements.

In one or more embodiments, an encoding stage is utilized in which two or more APIs are encoded into a genome string or chromosome. The genome string is then used as a basis to make API calls on the original APIs. An evaluation stage utilizes a fitness function to evaluate the outcomes of the API calls on the original APIs. A subset of the outcomes can be selected and subsequently "bred" in the direction of a problem solution. Breeding can take place utilizing, for example, crossover and/or mutation. Breeding, in this regard, produces "children" which make up the next genome string or strings for the next iteration of API calls. Breeding over time helps steer the direction of the problem solution to a desirable outcome.

BRIEF DESCRIPTION OF THE DRAWINGS

The same numbers are used throughout the drawings to reference like features.

DETAILED DESCRIPTION

Overview

Various embodiments enable automated testing of Application Program Interfaces (APIs) by abstracting call signatures for one or more similarly functioning APIs and processing the abstracted API call signatures utilizing one or more type of genetic algorithms.

Utilizing the inventive approach, test cases are built and then processed using a genetic algorithm. This can be done to both identify problems, such as bugs associated with the APIs, and/or to identify quality improvements.

In one or more embodiments, an encoding stage is utilized in which two or more similarly functioning APIs are encoded into a genome string or chromosome. The genome string is then used as a basis to make API calls on the original APIs. An evaluation stage utilizes a fitness function to evaluate the outcomes of the API calls on the original APIs. A subset of the outcomes can be selected and subsequently "bred" in the direction of a problem solution. Breeding can take place utilizing, for example, crossover and/or mutation. Breeding, in this regard, produces "children" which make up the next genome string or strings for the next iteration of API calls.

In the discussion that follows, a section entitled "Operating Environment" is provided and describes one environment in which one or more embodiments can be employed. Following this, a section entitled "Example Genetic Algorithm Test Module" describes an example genetic algorithm test module that can be utilized in accordance with one or more embodiments. Next, a section entitled "Genetic Algorithm Testing —Example" describes an example in accordance with one or more embodiments. Following this, a section entitled "Example Method" describes an example method in accordance with one or more embodiments. Last, a section entitled "Example System" describes an example system that can be utilized to implement one or more embodiments.

Consider now an example operating environment in which one or more embodiments can be implemented.

Operating Environment

Figure 1:
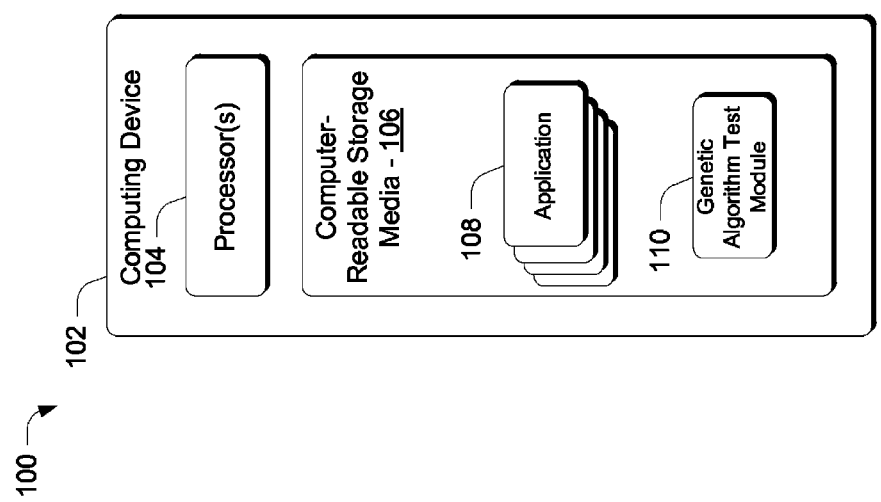
FIG. 1 illustrates an operating environment in which various principles described herein can be employed in accordance with one or more embodiments.

FIG. 1 illustrates an operating environment in accordance with one or more embodiments, generally at 100. Environment 100 includes a computing device 102 having one or more processors 104, one or more computer-readable storage media 106 and one or more applications 108 that reside on the computer-readable storage media and which are executable by the processor(s). The computer-readable storage media can include, by way of example and not limitation, all forms of volatile and non-volatile memory and/or storage media that are typically associated with a computing device. Such media can include ROM, RAM, flash memory, hard disk, removable media and the like. One specific example of a computing device is shown and described below in FIG. 7. Applications 108 can include Application Program Interfaces (APIs) that are to undergo processing as described below.

In addition, computing device 102 includes a software module in the form of a genetic algorithm test module 110. The genetic algorithm test module is configured to process API call signatures and abstract the call signatures into a form that can be processed by one or more genetic algorithms. The genetic algorithm test module 110 builds test cases and then analyzes the test cases using the genetic algorithm(s). This can be done to both identify problems, such as bugs, associated with the APIs, and/or to identify quality improvements.

In one or more embodiments, the genetic algorithm test module 110 utilizes an encoding stage in which two or more APIs are encoded into a genome string or chromosome. The genome string is then used as a basis to make API calls on the original APIs. An evaluation stage utilizes a fitness function to evaluate the outcomes of the API calls on the original APIs. A subset of the outcomes can be selected and subsequently "bred" in the direction of a problem solution. Breeding can take place utilizing, for example, crossover and/or mutation. Breeding, in this regard, produces "children" which make up the next genome string or strings for the next iteration of API calls. Examples of how this can be done are provided below.

Computing device 102 can be embodied as any suitable computing device such as, by way of example and not limitation, a desktop computer, a portable computer, a handheld computer such as a personal digital assistant (PDA), cell phone, and the like.

Having described an example operating environment, consider now a discussion of functionality associated with genetic algorithm test module 110.

Example Genetic Algorithm Test Module

Figure 2:
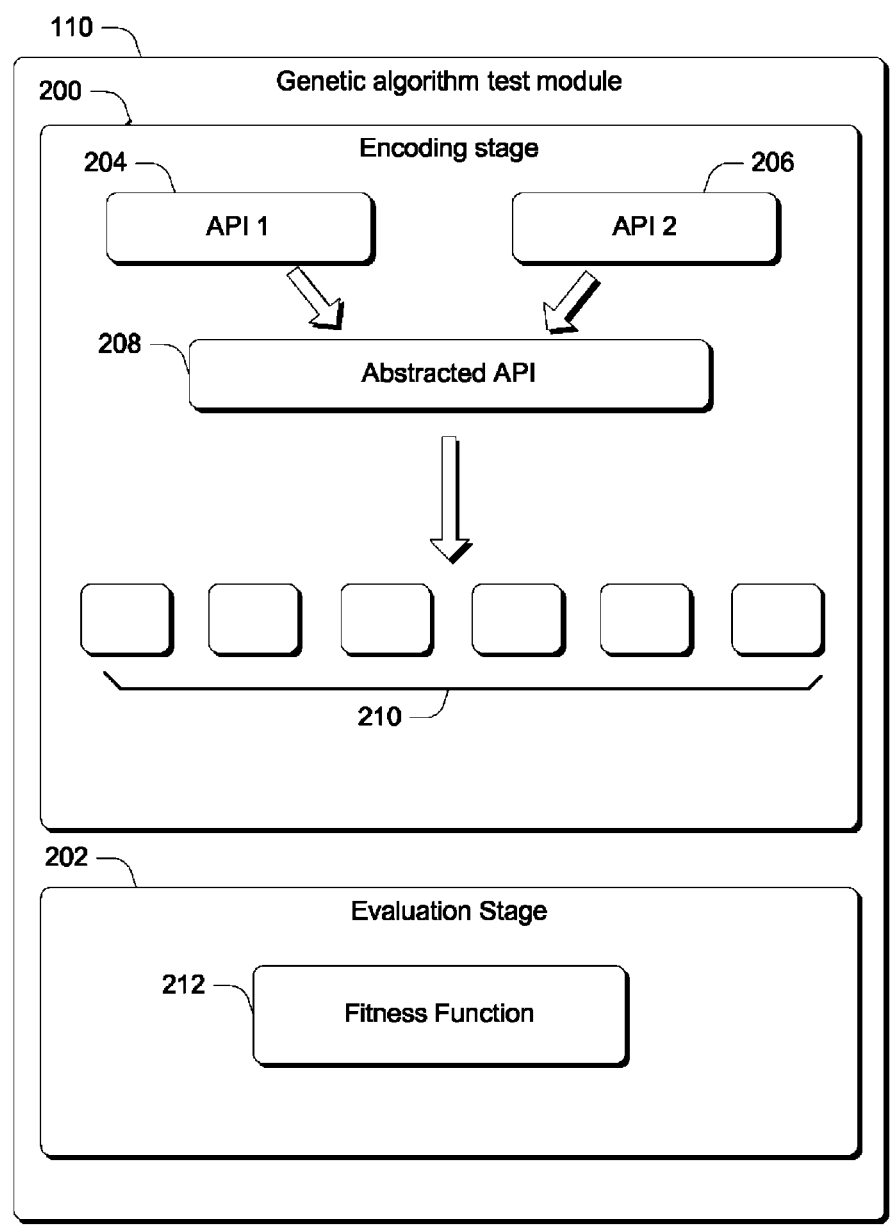
FIG. 2 illustrates an example genetic algorithm test module in accordance with one or more embodiments.

FIG. 2 illustrates an example genetic algorithm test module 110 in accordance with one or more embodiments. In this particular example, the genetic algorithm test module includes an encoding stage 200 and an evaluation stage 202.

In the illustrated and described embodiment, the encoding stage 200 is configured to process two or more APIs, here illustrated as APIs 204, 206 to produce an abstracted representation of an API, here illustrated as abstracted API 208. The encoding stage processes APIs 204, 206 by processing their individual call signatures and abstracting the call signatures into the abstracted API 208. The abstracted API 208 is then utilized as a basis to encode APIs 204, 206 into a genome string 210. The genome string 210 is initialized with values and then used as a basis to make API calls on APIs 204, 206.

Evaluation stage 202 includes a fitness function 212 that is utilized to evaluate the outcomes of the API calls on APIs 204, 206. A subset of the outcomes can be selected and subsequently "bred" in the direction of a problem solution. Breeding can take place utilizing, for example, crossover and/or mutation techniques. Breeding, in this regard, produces "children" which make up the next genome string or strings for the next iteration of API calls to APIs 204, 206. Having considered an example genetic algorithm test module, consider now an example in which genetic testing is utilized to test two similarly functioning graphical APIs with different call signatures that can be utilized to draw a rectangle.

Genetic Algorithm Testing—Example

Assume, for purposes of this example, there are two different graphical APIs that can draw a rectangle. API1 can be represented as follows:

DrawRectangle(Topleft co-ordinate, Bottomright co-ordinate);

API2 can be represented as follows:

DrawRectangle(Topleft co-ordinate, Breadth, Diagonal length);

Note that the call signatures for each API are different. Specifically, while the first parameter in each API is the same, parameters that follow differ. Next, an abstracted API is created from API1 and API2 and is used as the basis to make API calls on both API1 and API2. In this particular example, the following constitutes but one example of an abstract syntax, easily mappable to APIs under consideration, that can be used to represent the APIs in the form of the abstracted API:

DrawRectangle(TopLeft x-coordinate, TopLeft y-coordinate, length, breadth);

In the illustrated and described embodiment, this abstract syntax is parsed and converted to the individual API calls (API1 and API2) to pass down to the graphics engine to render.

Figure 3:
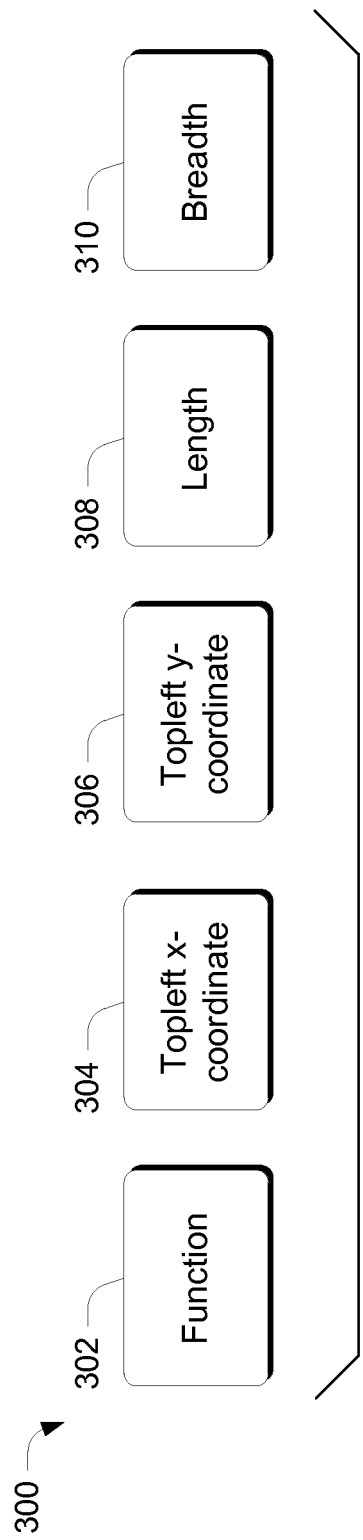
FIG. 3 illustrates an example genome string or chromosome in accordance with one or more embodiments.

In the described embodiments, the abstracted API is encoded into genes that represent a chromosome. A chromosome is a string whose position elements (i.e., a gene) pertain to a particular part of the encoded problem space. As an example, consider FIG. 3. There, a genome string or chromosome representing the abstracted API is shown generally at 300. In this example, genome string 300 includes five genes 302, 304, 306, 308, and 310. These genes represent the genes for one individual rectangle in a population which comprises multiple rectangles, thus making up a chromosome. The initial population is a set of chromosomes, each representing a test case—in this example, a set of rectangles which will be passed through the genetic algorithm.

The first gene 302 is used to indicate that the genome string is a DrawRectangle( ) call. The next four genes 304, 306, 308, and 310 are used to generate the parameters that are utilized to make the actual drawing calls to API1 and API2. This is now encoded in an abstract form, or middle language. The abstract language in this example is in the form of an XML syntax which is expressed as:

<DrawRectangle x="10" y="20" length="100" breadth="50"/>

Now, there is information that can be utilized to make a DrawRectangle( ) call from either API1 or API2.

Now that we have the encoded genome string, processing can start with some test cases by drawing a set of rectangles with random parameters and running the genetic algorithm over N iterations. N is selected based on the trade-off between the time it takes to execute the iterations and the degree of convergence towards the desired solution. In the illustrated and described embodiment, for each iteration, the graphical output from each API call is evaluated using a fitness function. Any suitable fitness function can be utilized. In this particular example, a fitness function in the form of a Structural SIMilarity (SSIM) index is utilized. SSIM, as will be appreciated by the skilled artisan, is a Digital Signal Processing (DSP) technique that evaluates graphical output quality similarity using properties of the Human Visual System (HVS). SSIM is used, in this example, to look for bugs and graphical artifacts for each individual test case. The SSIM approach can be used to assign a high probability of reproduction to the chromosomes/test cases based on the SSIM index value.

In the case of searching for graphical artifacts between two APIs, the more the images differ, the more likely there is a bug, and consequently, the more likely the parameters used to generate these images will be passed on to the next generation in the genetic algorithm.

In others words, in this particular example, the desire is to breed chromosomes that have the greatest graphical differences. This is done by taking the top X % of chromosomes which generate the greatest graphical differences. From this top X % of chromosomes, they can then be bred using genetic algorithm principles, such as crossover and mutation, to produce children which make up the new set of chromosomes/test cases for the next iteration of API calls.

Figure 4:
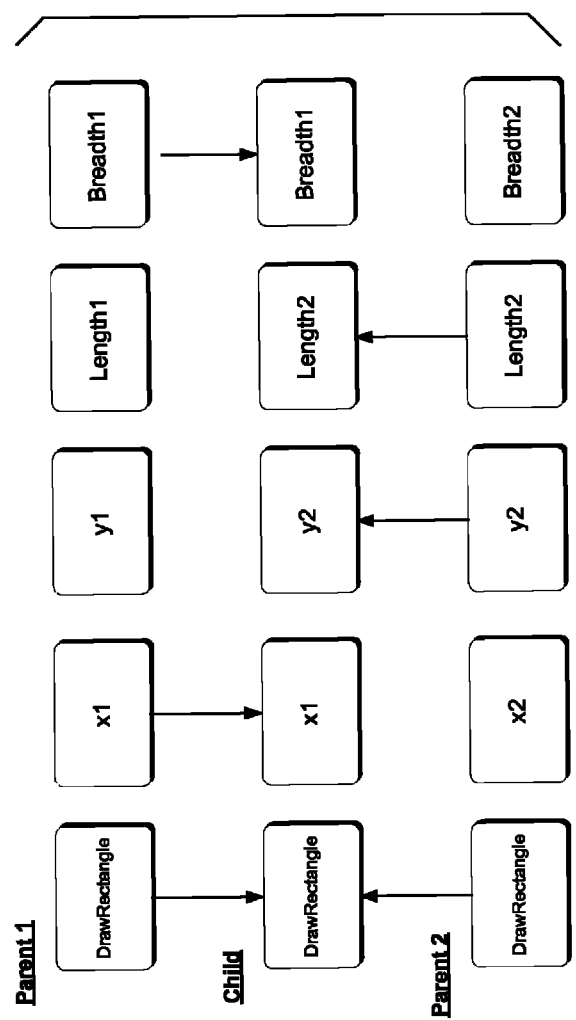
FIG. 4 illustrates a breeding process in accordance with one or more embodiments.

In the breeding process, individual children will inherit some of its parents' genes. This process of randomly swapping genes between chromosomes is known as "crossover". As an example, consider FIG. 4.

There, two parents are represented as Parent1 and Parent2. These parents represent a portion of the top X % of chromosomes from a previous iteration. For each gene of the child chromosome, the parent from which the gene is inherited is randomly chosen. Notice the child chromosome inherits x1 and Breadth1 from Parent1, and y2 and Length2 from Parent2 through cross over. This child, having been bred as described above, is utilized as a test case for the next iteration of API calls.

As will be appreciated by the skilled artisan, in addition to crossover, mutation can be utilized to add diversity by randomly choosing genes within the chromosomes, and changing their values.

Figure 5:
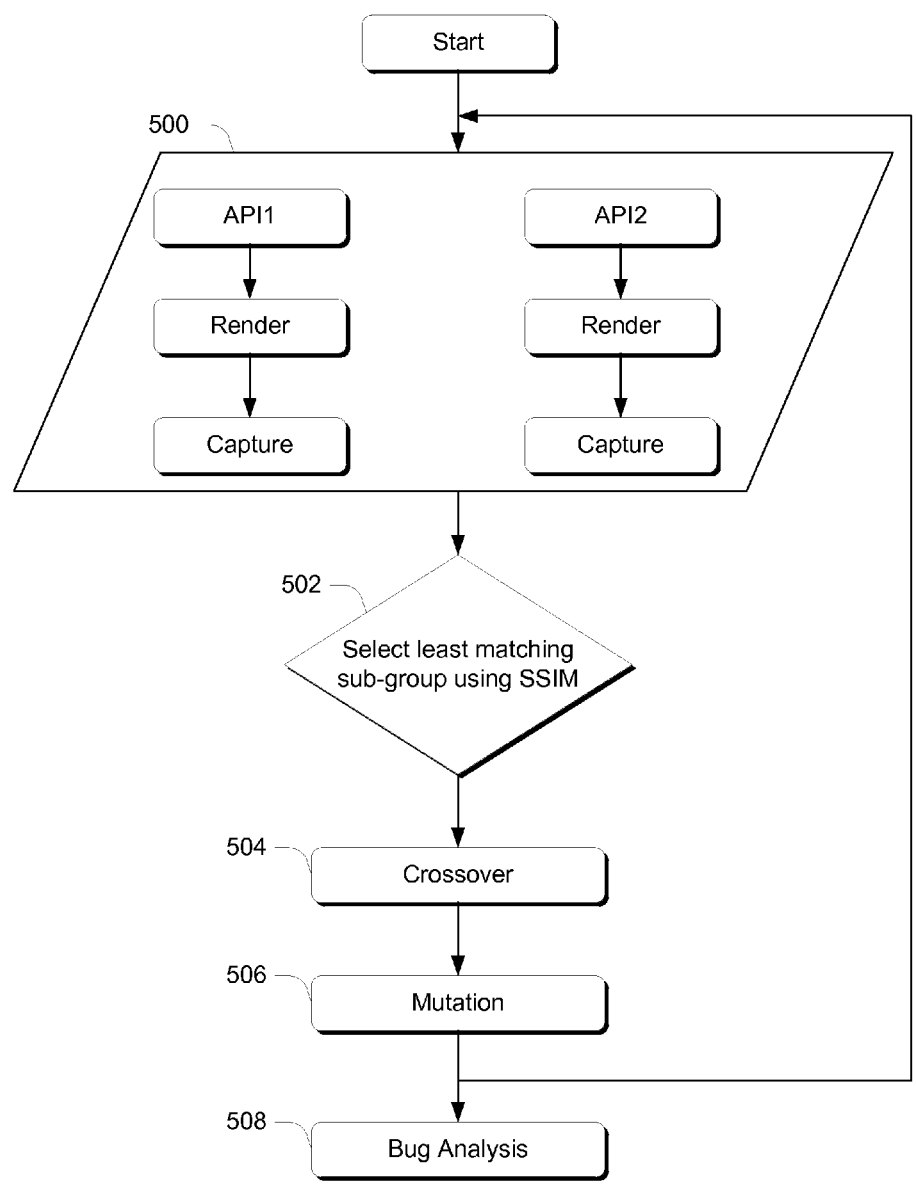
FIG. 5 illustrates a diagrammatic representation of genetic processing in accordance with one or more embodiments.

The process of employing a genetic algorithm as described above is diagrammatically illustrated in FIG. 5. In FIG. 5, API1 and API2 are illustrated within a system 500. For purposes of this example, both APIs have already been encoded as a genome string as described above. Each API is called using values obtained from the chromosome. This causes the APIs, in this particular example, to render an output which is then captured. At 502, the captured output is processed by a fitness function. In this particular example, the fitness function is a SSIM index which allows a subgroup of chromosomes which generate the least matching outputs to be selected. The purpose of selecting a least matching subgroup is to allow the genetic algorithm to converge towards a desirable solution.

Once the subgroup is selected at 502, the subgroup is subjected to crossover processing at 504 and mutation at 506 for purposes of breeding the subgroup as described above. For the next iteration, the chromosomes that resulted from the breeding process are utilized for the next API calls to be made to API1 and API2. This process continues for N iterations, whereupon bug analysis can take place at 508.

Example Method

Figure 6:
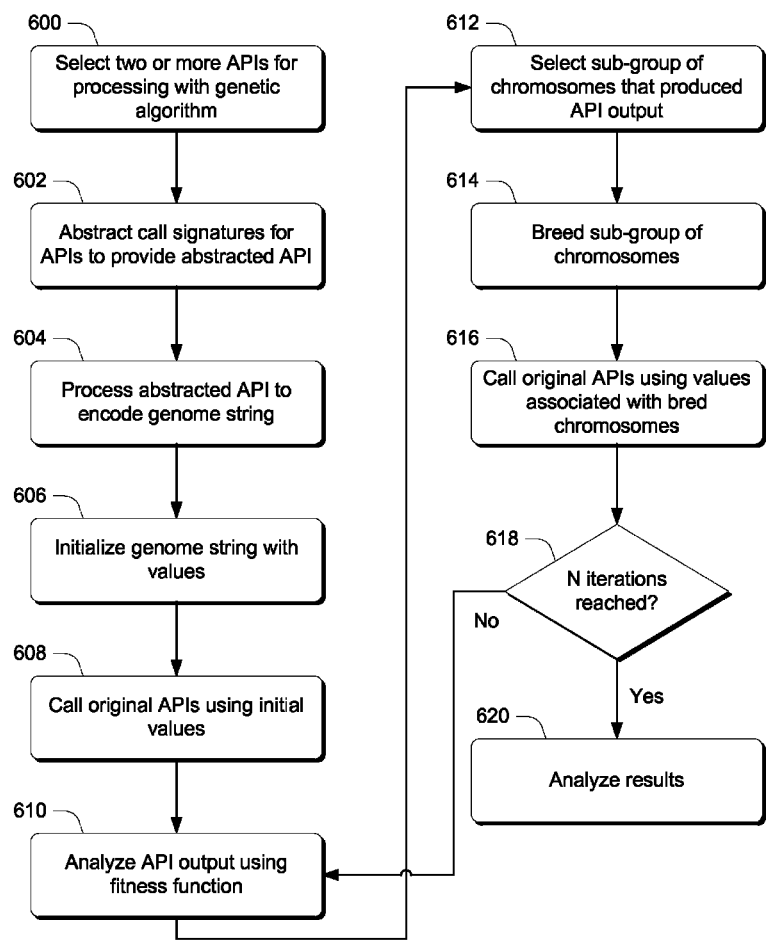
FIG. 6 is a flow diagram that describes steps in a method in accordance with one or more embodiments.

FIG. 6 is a flow diagram that describes steps in a method in accordance with one or more embodiments. The method can be implemented in connection with any suitable hardware, software, firmware, or combination thereof In at least some embodiments, aspects of the method can be implemented by a suitably-configured genetic algorithm test module, such as the one shown and described in connection with FIG. 1.

Step 600 selects two or more similarly functioning APIs for processing with a genetic algorithm. Any suitable genetic algorithm can be utilized without the departing from the spirit and scope of the claimed subject matter. Step 602 abstracts call signatures of the APIs to provide an abstracted API. Examples of how this can be done are provided above. Step 604 processes the abstracted API to encode genome strings for the APIs. Processing the abstracted API can include, in at least some embodiments, representing the abstracted API in a middle markup language. Step 606 initializes the genome string with values and step 608 calls the original APIs, from step 600, using the initial values.

Step 610 analyzes API output using a fitness function. Any suitable fitness function can be utilized without departing from the spirit and scope of the claimed subject matter. Further, fitness functions can be selected to look for "convergence" or "divergence" of values in the API output, which can help in the evaluation of APIs with respect to quality improvements or bugs. Step 612 selects a sub-group of chromosomes that produced the API output. Any suitable criteria can be utilized to enable sub-group selection.

Step 614 breeds the sub-group of chromosomes to produce children chromosomes having their own particular values. Breeding can include any suitable type of genetic-based breeding operations including, by way of example and not limitation, crossover and/or mutation. Step 616 calls the original APIs using values associated with the bred chromosomes. Step 618 ascertains whether N iterations have been reached. If not, the method then branches to step 610 for further analysis by the fitness function. If, on the other hand, N iterations have been reached, step 620 analyzes the results of the API calls, as in step 508 in FIG. 5.

The processing that takes place in the loop represented by steps 610-616 can take place any suitable number of times. For example, the processing can take place a set or defined number of times. Alternately or additionally, the processing can take place until a desired threshold is achieved.

Having described an example method in accordance with one or more embodiments, consider now a discussion of an example system that can be utilized to implement the embodiments described above.

Example System

Figure 7:
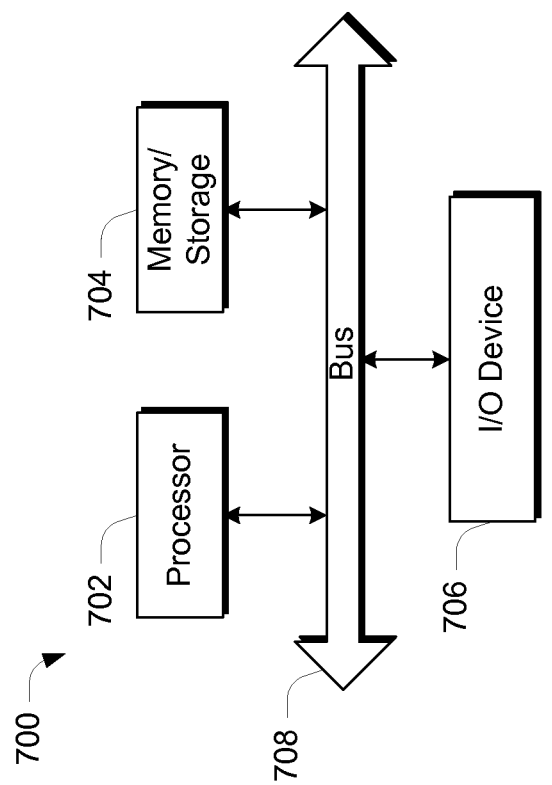
FIG. 7 illustrates an example system that can be utilized to implement one or more embodiments.

FIG. 7 illustrates an example computing device 700 that can be used to implement the various embodiments described above. Computing device 700 can be, for example, computing device 102 of FIG. 1 or any other suitable computing device.

Computing device 700 includes one or more processors or processing units 702, one or more memory and/or storage components 704, one or more input/output (I/O) devices 706, and a bus 708 that allows the various components and devices to communicate with one another. Bus 708 represents one or more of any of several types of bus structures, including a memory bus or memory controller, a peripheral bus, an accelerated graphics port, and a processor or local bus using any of a variety of bus architectures. Bus 708 can include wired and/or wireless buses.

Memory/storage component 704 represents one or more computer storage media. Component 704 can include volatile media (such as random access memory (RAM)) and/or nonvolatile media (such as read only memory (ROM), Flash memory, optical disks, magnetic disks, and so forth). Component 704 can include fixed media (e.g., RAM, ROM, a fixed hard drive, etc.) as well as removable media (e.g., a Flash memory drive, a removable hard drive, an optical disk, and so forth).

One or more input/output devices 706 allow a user to enter commands and information to computing device 700, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer-readable storage media".

"Computer-readable storage media" include volatile and non-volatile, removable and non-removable media implemented in any method or technology for storage of information such as computer readable instructions, data structures, program modules, or other data. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

CONCLUSION

Various embodiments enable automated testing of Application Program Interfaces (APIs) by abstracting API call signatures and processing the abstracted API call signatures utilizing one or more genetic algorithms. Utilizing the inventive approach, test cases are built and then analyzed using a genetic algorithm. This can be done to both identify problems, such as bugs, associated with the APIs, and/or to identify quality improvements.

In one or more embodiments, an encoding stage is utilized in which two or more APIs are encoded into a genome string or chromosome. The genome string is then used as a basis to make API calls on the original APIs. An evaluation stage utilizes a fitness function to evaluate the outcomes of the API calls on the original APIs. A subset of the outcomes can be selected and subsequently "bred" in the direction of a problem solution. Breeding can take place utilizing, for example, crossover and/or mutation. Breeding, in this regard, produces "children" which make up the next genome string or strings for the next iteration of API calls.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method comprising:
abstracting call signatures for two or more APIs to provide an abstracted API;
processing the abstracted API to encode a genome string;
initializing the genome string with values;
calling the two or more APIs using initialized values effective to produce API outputs;
analyzing the API outputs using a fitness function;
selecting, responsive to said analyzing, a sub-group of chromosomes that produced the API outputs;
breeding the subgroup of chromosomes to produce children chromosomes having their own particular values; and
calling the two or more APIs using values associated with the children chromosomes.

2. The method of claim 1, wherein the fitness function is configured to look for closeness of values in the API outputs.

3. The method of claim 1, wherein the fitness function is configured to look for divergence of values in the API outputs.

4. The method of claim 1, wherein said breeding comprises crossover processing.

5. The method of claim 1, wherein said breeding comprises mutation processing.

6. The method of claim 1, wherein said breeding comprises crossover processing and mutation processing.

7. The method of claim 1 further comprising, after calling the two or more APIs using values associated with the child chromosomes, repeating said analyzing, selecting, breeding, and calling the two or more APIs using values associated with subsequently bred chromosomes.

8. One or more computer-readable storage memory embodying instructions which, when executed, implement a method comprising:
abstracting call signatures for two or more graphics APIs to provide an abstracted API;
processing the abstracted API to encode a genome string;
initializing the genome string with values;
calling the two or more graphics APIs using initialized values effective to produce API outputs;
analyzing the API outputs using a fitness function;
selecting, responsive to said analyzing, a sub-group of chromosomes that produced the API outputs;
breeding the subgroup of chromosomes to produce children chromosomes having their own particular values; and
calling the two or more graphics APIs using values associated with the children chromosomes.

9. The one or more computer-readable storage memory of claim 8, wherein the fitness function is configured to look for closeness of values in the API outputs.

10. The one or more computer-readable storage memory of claim 8, wherein the fitness function is configured to look for divergence of values in the API outputs.

11. The one or more computer-readable storage memory of claim 8, wherein said breeding comprises crossover processing.

12. The one or more computer-readable storage memory of claim 8, wherein said breeding comprises one or more of mutation processing or crossover processing.

13. The one or more computer-readable storage memory of claim 8, wherein said fitness function comprises a Structural SIMilarity (SSIM) index.

14. The one or more computer-readable storage memory of claim 8 further comprising, after calling the two or more APIs using values associated with the children chromosomes, repeating said analyzing, selecting, breeding, and calling the two or more graphics APIs using values associated with subsequently bred chromosomes.

15. A system comprising;
one or more processors;
one or more computer-readable storage media storing instructions which, when executed, perform operations comprising:
abstracting call signatures for two or more APIs to provide an abstracted API;
processing the abstracted API to encode a genome string;
initializing the genome string with values;
calling the two or more APIs using initialized values effective to produce API outputs;
analyzing the API outputs using a fitness function;
selecting, responsive to said analyzing, a sub-group of chromosomes that produced the API outputs;
breeding the subgroup of chromosomes to produce children chromosomes having their own particular values; and
calling the two or more APIs using values associated with the children chromosomes.

16. The system of claim 15, wherein the fitness function is configured to look for closeness of values in the API outputs.

17. The system of claim 15, wherein the fitness function is configured to look for divergence of values in the API outputs.

18. The system of claim 15, wherein said breeding comprises crossover processing.

19. The system of claim 15; wherein said breeding comprises mutation processing.

20. The system of claim 15, wherein said breeding comprises crossover processing and mutation processing.

21. The system of claim 15 further comprising, after calling the two or more APIs using values associated with the child chromosomes, repeating said analyzing, selecting, breeding, and calling the two or more APIs using values associated with subsequently bred chromosomes.

* * * * *